(12) United States Patent
Rudder et al.

(10) Patent No.: US 6,258,418 B1
(45) Date of Patent: Jul. 10, 2001

(54) METHOD FOR PRODUCING DIAMOND-TILED COOKING UTENSILS AND OTHER WORKPIECES FOR DURABLE STICK-RESISTANT SURFACES

(76) Inventors: Ronald A. Rudder, 1026 Pebble Brook Dr., Wake Forest, NC (US) 27587; Raymond E. Thomas, 818 Shady Lawn Rd, Chapel Hill, NC (US) 27514

( * ) Notice: Subject to any disclaimer, the term of this patent is extended or adjusted under 35 U.S.C. 154(b) by 0 days.

(21) Appl. No.: 09/338,485

(22) Filed: Jun. 23, 1999

Related U.S. Application Data (60) Provisional application No. 60/090,700, filed on Jun. 24, 1998.

(51) Int. Cl.[7] ..................................................... G05D 1/06
(52) U.S. Cl. .................. 427/475; 427/202; 427/249.8; 427/343; 427/374.1; 427/427
(58) Field of Search .................................. 427/475, 483, 427/180, 201, 202, 337, 343, 356, 249.8, 249.12, 249.14, 374.1, 421, 427

(56) References Cited

U.S. PATENT DOCUMENTS

| | | |
|---|---|---|
| 2,071,817 | 2/1937 | Dean . |
| 2,076,329 | 4/1937 | Wheeler . |
| 2,851,376 | 9/1958 | Adlassnig . |
| 3,338,732 | 8/1967 | Holcomb . |
| 3,482,951 | 12/1969 | Hubbell et al. . |
| 3,523,817 | 8/1970 | Reiss . |
| 3,650,714 | 3/1972 | Farkas . |
| 3,837,895 | 9/1974 | Pryor et al. . |
| 3,888,790 | 6/1975 | Chay . |
| 3,900,684 | 8/1975 | Edwards et al. . |
| 3,927,243 | 12/1975 | Theisen . |
| 4,064,311 | 12/1977 | McLean et al. . |
| 4,221,824 | 9/1980 | Leonard et al. . |
| 4,228,142 | 10/1980 | Holcombe, Jr. et al. . |
| 4,407,868 | 10/1983 | Iizawa . |

(List continued on next page.)

FOREIGN PATENT DOCUMENTS

| | | | |
|---|---|---|---|
| 196 29 241 | * | 12/1997 | (DE) . |
| 0 264 674 | * | 4/1988 | (EP) . |

OTHER PUBLICATIONS

"Demonstration of a method to fabricate a large–area diamond single cyrstal," by J.B. Posthill et al., *Thin Solid Films*, vol. 271, Elsevier Science S.A., (1995) pp. 39–49.

"Mosaic Growth of Diamond," by G. Janssen and L.J. Gilling, *Advances in new Diamond Science and Technology*, MYU, Tokyo (1994) pp. 295–297.

"Proceedings of the Second Internation Symposium on Diamond Materials," edited by A. J. Purdes et al., Dielectric Science and Technology, Electronics, and High Temperature Materials Divisions of the Electrochemical Society, Inc., Proceedings vol. 91–8, May 5–10, 1991, (5 pgs.).

*Primary Examiner*—Fred J. Parker
(74) *Attorney, Agent, or Firm*—Oblon, Spivak, McClelland, Maier & Neustadt, P.C.

(57) ABSTRACT

A method for producing a durable, non-stick, diamond-tiled implement and the diamond-tiled implement thereby produced. Diamond particles are distributed on a surface of a workpiece containing a ceramic binder. The ceramic binder on the surface of the workpiece is heated to above its glass temperature to fuse the diamond particles in and onto the workpiece. The workpiece is then cooled so that the diamond particles are bonded to and at least partially embedded in the ceramic binder at the surface of the workpiece to produce durable, non-stick, diamond-tiled implements including cookware, bakeware, hot-presses, ski surfaces, skid surfaces, marine articles, and mechanical polishing wheels. Other implements of this invention utilize a high diamond content to produce thermally conducting and electrically insulating coatings for heat spreaders or heaters.

28 Claims, 4 Drawing Sheets

U.S. PATENT DOCUMENTS

| | | |
|---|---|---|
| 4,460,630 | 7/1984 | Nishino et al. . |
| 4,607,512 | 8/1986 | Deville . |
| 4,661,180 | 4/1987 | Frushour . |
| 4,695,321 | 9/1987 | Akashi et al. . |
| 4,749,594 * | 6/1988 | Malikowski et al. . |
| 5,164,220 | 11/1992 | Caballero . |
| 5,266,357 | 11/1993 | Preuss et al. . |
| 5,277,940 | 1/1994 | Caballero . |
| 5,453,303 | 9/1995 | Holcombe, Jr. et al. . |
| 5,462,772 | 10/1995 | Lemelson . |
| 5,624,756 | 4/1997 | Ueda et al. . |
| 5,635,254 | 6/1997 | Holcombe et al. . |
| 5,686,152 | 11/1997 | Johnson et al. . |
| 5,731,846 | 3/1998 | Kreitman et al. . |
| 5,762,660 * | 6/1998 | Mahowiecki et al. . |
| 5,795,626 * | 8/1998 | Gabel et al. . |

* cited by examiner

METHOD FOR PRODUCING DIAMOND-TILED COOKING UTENSILS AND OTHER WORKPIECES FOR DURABLE STICK-RESISTANT SURFACES

CROSS REFERENCE TO RELATED APPLICATIONS

This application claims priority under 35 USC §119 to U.S. provisional patent application Ser. No. 60/090,700 filed Jun. 24, 1998, the entire contents of which is incorporated herein by reference.

BACKGROUND OF THE INVENTION

1. Field of the Invention

This invention relates to both a method for producing a durable non-stick workpiece article and the article of manufacture produced by the inventive method.

More particularly, this invention relates to the consolidation of diamond powder to a binder coating the surface of a metal substrate.

2. Discussion of the Background

Non-stick articles are quite prevalent in today's world. Polytetrafluoroethylene (TEFLON) is one material that is widely-used for many non-stick applications. Besides TEFLON, silicone coatings are also used in non-stick applications. Both TEFLON and silicone, however, are very soft materials and suffer from abrasive wear which shortens the lifetime of the non-stick article. In addition, TEFLON and silicone have relatively low temperature ratings. For example, when a TEFLON coating becomes too hot, the TEFLON begins to decompose spontaneously.

Porcelain enameling is a commercial, industrial scale technology which is used to coat a variety of objects of various sizes and shapes. Porcelain by itself can provide a smooth, stick resistant surface. The uses of porcelain enameling include glass-lined water heater tanks, cookware, kitchen appliances, barbeques, heat exchangers, architectural panels, decorative jewelry, road signs, and silo panels used for grain storage. Porcelain enamel is used as a protective coating on a variety of metals and is used as a glazing on glassware and whiteware.

The porcelain coating industry for years has developed appropriate enamels for various base substrate materials. The porcelain coating industry relies heavily on experiential data to obtain the best enamel coating and adhesion to the wide variety of metals which it coats. The methods used to coat aluminum with porcelain are different than the methods used to coat steel with porcelain. Likewise, methods for coating low-carbon steel are different than methods for coating cast iron, and methods for coating copper and gold are different from methods for coating steel formulas. Methods of applying a porcelain coat to metal typically include the application of ground coats (also called base coats). Also, these methods typically contain top coats which will control the background color and finish of the coated workpiece; however, porcelain surfaces are prone to scratching, particularly when being cleaned with an abrasive.

Diamond, due to its low coefficient of friction and high hardness, is an excellent non-stick material; however, high-pressure, high-temperature (HPHT) synthesis of diamond on common metal and glass surfaces is not possible because the temperatures attained during HPHT synthesis exceed the melting points of many common metals and glasses. Further, HPHT synthesis is only practical for limited areas because of the high pressures (100 GPa) required for HPHT synthesis.

Diamond is known to have many superior properties when compared to other materials. These properties make diamond a viable candidate for applications where the surface of a material is exposed to mechanical, chemical, or physical wear. For example, diamond is known to have a low coefficient of friction and superior hardness. As such, diamond would be an ideal candidate for non-stick surfaces and could potentially replace TEFLON coatings on cooking surfaces. Diamond is also known to have low sputter yield and is extremely chemically resistant. As such, diamond would be an excellent protective coating on electrodes and surfaces exposed to plasmas and ion bombardment. Diamond's superior chemical resistance would make it an ideal container coating in applications where leaching of the wall materials by the chemical effluent either produces contamination of the process stream or produces a long-term reliability problem for the storage of the effluent.

Unfortunately, the application of diamond directly to typical surfaces presents high technical and cost barriers which have either made diamond application impossible or extremely costly. On the one hand, high pressure synthesis is used to produce nearly 100 tons of synthetic grit per year at a fairly cheap cost per carat (current selling prices are under $1.00/carat). The high temperatures and pressures required for high pressure synthesis of diamond are not compatible with coating diamond directly onto common materials such as steels, aluminum, or glassy materials. On the other band, chemical vapor deposition (CVD) of diamond is a viable technical approach for the formation of diamond on these common materials. Indeed, deposition on these materials directly or with the use of surface pretreatments or inter-layers has been demonstrated. U.S. Pat. No. 5,686,152 to Johnson et. al. teaches a method using electrical bias to directly nucleate and grow diamond films on substrates using a CVD approach wherein an electrical bias is applied to the substrate to enhance nucleation. Unfortunately, the high cost of CVD diamond ($5–$20/carat) restricts this approach.

Chemical vapor deposition (CVD) of diamond can be conducted at atmospheric pressures. However, industrial economies of scale cannot be realized with the manufacturing equipment currently available to produce large area CVD coatings. As a result, large area CVD coatings of diamond are too costly for manufacturers to feasibly employ.

U.S. Pat. No. 3,338,732 to Holcomb teaches a method of embedding silica particles in a porcelain enamel to give the porcelain enamel a rough appearance. A porcelain ground coat is applied to a metal substrate and heated so that the porcelain ground coat becomes fused to the metal substrate. Next, a wet cover coat of porcelain enamel is applied to the ground coat by spraying or dipping. While the cover coat is still wet, silica particles are sprinkled over the wet cover coat so that the silica particles become partially embedded in the wet cover coat. The cover coat is heated to fuse the cover coat to the ground coat and to fuse the silica particles to the cover coat. Next, a top coat is applied to the exposed portions of the cover coat and the silica particles. The top coat is then heated to fuse the top coat to the exposed portions of the cover coat and the silica particles. The resulting product has a rough surface on which there is no exposed silica.

U.S. Pat. No. 3,650,714 to Farkas discloses a method of coating single diamond chips with titanium or zirconium. The diamond chips are relatively large, having a mesh size of 200–250. Farkas teaches overlaying the titanium-coated diamonds with a second layer of nickel or copper or both nickel and copper, placing the coated diamonds on a steel substrate, and covering the coated diamonds with powdered ceramic. The powdered ceramic is then vitrified to secure the coated diamonds to the steel substrate. Since the diamond chips are coated, no portion of the surface of the diamonds is exposed and the diamonds are not bonded to the ceramic.

U.S. Pat. No. 4,749,594 to Malikowski et al. discloses a method for coating ceramic surfaces with hard substances. The method includes the steps of coating a metal or ceramic substrate with a metal powder, the spraying the substrate with a diamond powder, and heating the coated substrate to between 900 and 1200° C. The heating step causes the metal powder to melt. The molten metal wets both the diamond particles and the substrate. When the melted metal is cooled, diamond particles from the diamond powder are integrally bonded to the substrate by the formed solder (hardened metal). The step of heating the coated substrate is performed in a high purity argon atmosphere or at sub-atmospheric pressure to prevent reactions between the active component of the metal powder and the remaining gases. In a first example, the invention is practiced with 40–50 micron diamond powder; in a second example, the invention is practiced with 60–80 micron diamond powder.

U.S. Pat. Nos. 5,164,220 and 5,227,940 to Caballero disclose a method of coating a metal substrate with treated diamond particles. Chemical plasma deposition is performed to grow an SiC crystal layer on the diamonds. Caballero discloses several different techniques for coating the metal substrate with the treated diamond particles. These techniques include sintering, brazing, and electroplating.

U.S. Pat. No. 5,453,303 to Holcombe et al. teaches a method of depositing a full diamond coating on a substrate. A powder mixture of glassy carbon and diamond particles is heated and impinged upon the substrate at high velocity. Upon impact with the substrate, the glassy carbon is phase transformed to diamond. The diamond particles promote the phase transformation of the glassy carbon to diamond. Similarly, U.S. Pat. No. 5,635,254 to Holcombe et al. teaches a method of depositing a layer of diamond or diamond-like material on a substrate. In one embodiment, a plasma gas stream heats and propels a mixture of glassy carbon and diamond particles onto the substrate. The mixture is then quenched on the surface of the substrate to produce a diamond coating.

SUMMARY OF INVENTION

Accordingly, it is an object of the present invention to take advantage of the durability and non-stick characteristics of diamond in providing a novel durable, non-stick workpiece at relatively low cost.

It is also an object of the present invention to provide a novel method of manufacturing a durable, non-stick workpiece in which durability and non-stick characteristics are achieved by use of diamond.

It is also an object of the present invention to provide a method for producing a diamond-tiled, durable, non-stick surface on a variety of objects having various, shapes, sizes and surface areas.

It is also an object of the present invention to provide an article of manufacture having a durable, non-stick, diamond-tiled surface.

These and other objects of the present invention are achieved according to a novel method of producing a diamond coated implement wherein a workpiece having a surface including a ceramic binder is provided. Diamond particles are distributed on the surface of a workpiece. The surface is heated to melt at least a portion of the ceramic binder. Then the surface of the workpiece is cooled so that a portion of the diamond particles remain bonded to, and embedded in, the ceramic binder at an exposed surface of the workpiece to produce a diamond-tiled coating layer. Optionally, a ceramic binder may be distributed on the workpiece as a dry powder frit, eliminating the need to provide a workpiece having a surface that includes a ceramic binder.

According to the novel method of the present invention, a durable, non-stick, diamond-tiled surface coating is provided on the workpiece (i.e. the surface is diamond-tiled). The inclusion of diamond powders in the surface of the workpiece causes the durability of the workpiece to surpass the durability of conventional workpieces that are coated with TEFLON or with porcelain alone. The diamond coated surface is resilient to high temperatures and resistant to abrasion.

BRIEF DESCRIPTION OF DRAWINGS

A more complete appreciation of the invention will be obtained as the same becomes better understood by reference to the following detailed description when considered in connection with the accompanying drawings, wherein.

DESCRIPTION OF THE PREFERRED EMBODIMENTS

Figure 1:
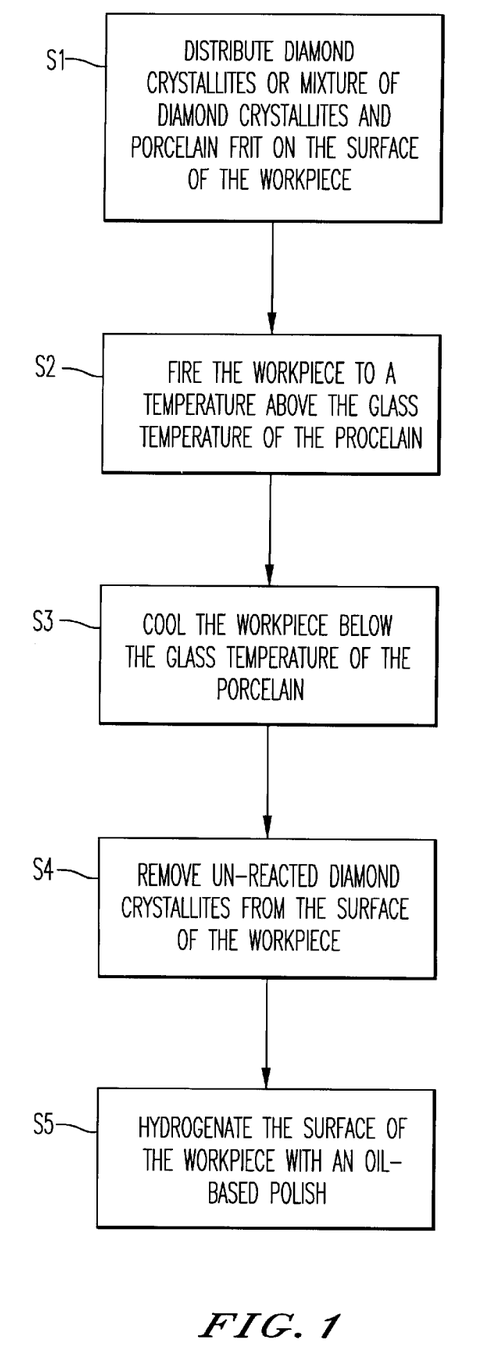
FIG. 1 is a flowchart describing the method of forming a diamond-tiled surface in accordance with the teachings of the present invention.
Figure 2A:
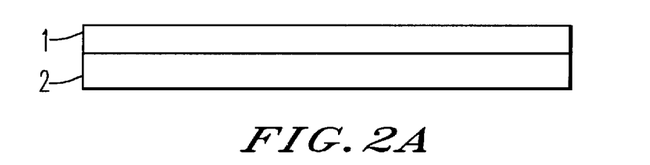
FIGS. 2(a) through 2(e) are sectional views of a workpiece at various processing steps when using a fired porcelain ceramic surface as the starting workpiece.
Figure 2B:
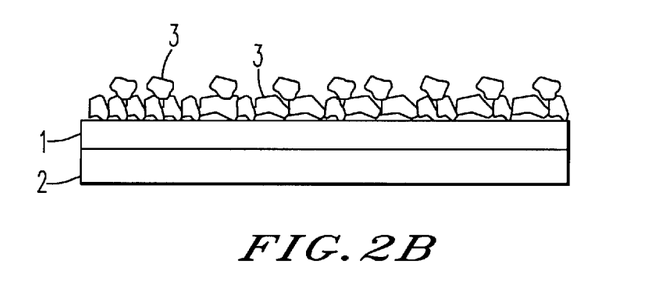
Figure 2C:
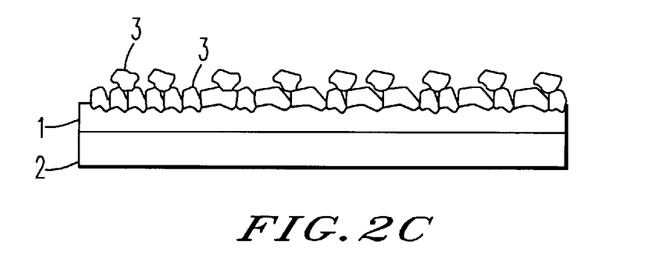
Figure 2D:
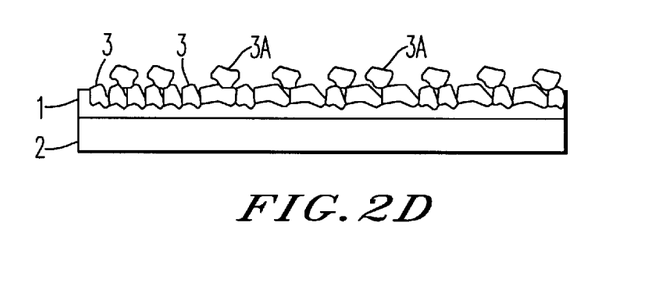
Figure 2E:
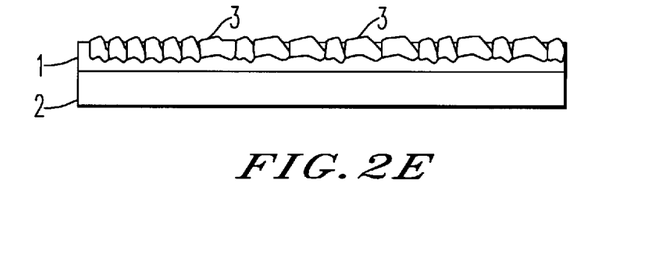
Figure 3A:
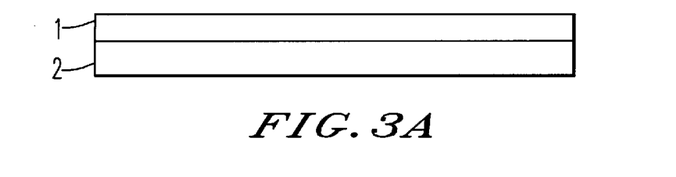
FIGS. 3(a) through 3(e) are sectional views of a workpiece at various processing steps when using porcelain frit and diamond powder to coat a porcelain ceramic workpiece.
Figure 3B:
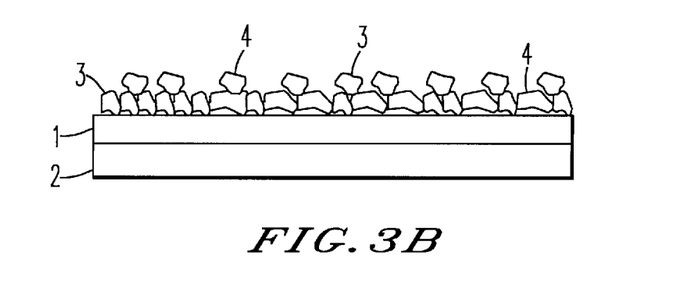
Figure 3C:
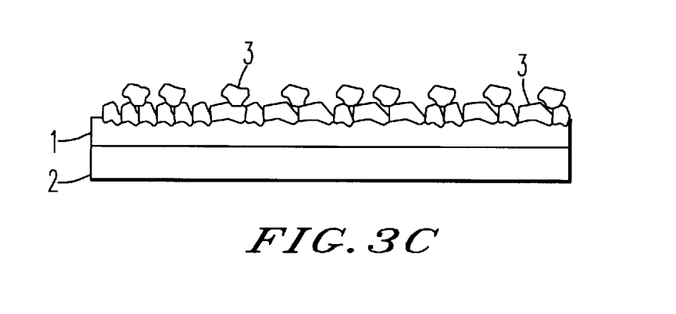
Figure 3D:
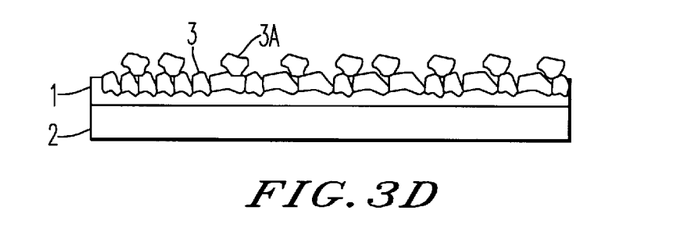
Figure 3E:
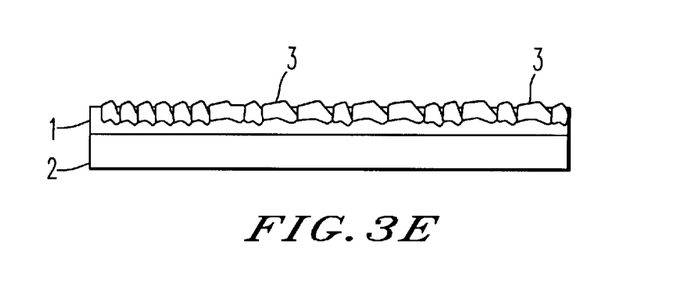

Referring now to the drawings, wherein like reference numerals designate identical or corresponding parts throughout the several views, FIG. 1 is a flow chart describing a method of providing a workpiece with a diamond-tiled surface in accordance with the teachings of the present invention.

In step S1, diamond crystallites or a mixture of diamond crystallites and porcelain frit are distributed evenly over the surface of the workpiece. The porcelain surface can be provided on the workpiece using any appropriate technique known in the porcelain enamel industry. Alternatively, a workpiece that already has a porcelain surface can be used.

Any suitable technique may be used to distribute the diamond crystallites or mixture of diamond crystallites and porcelain flit over the surface of the workpiece. In one embodiment, a suspension of diamond powder is provided in an aerosol medium. The aerosol is sprayed upon the porcelain surface whereupon the solvent evaporates, leaving behind the dry diamond powder as a top coat. It is important for cost control that the aerosol method not use excess diamond powder which will merely add undue cost to the coating process. The porcelain industry currently is developing solvent-less electrostatic spray techniques used quite commonly now in the paint industry to restrict volatile organic compound (VOC) emissions. These techniques are very efficient with little paint pigment loss. These electrostatic spray techniques may be used to provide a very precise and controlled method for uniformly dispensing diamond powder onto the porcelain surface. These simple spray techniques lend themselves to patterning of the diamond on the workpiece surfaces.

Any diamond powder can be used to provide the diamond crystallites used for the invention. For applications as a diamond-tiled cookware surface, the powder is graded to a size that is less than 5 microns in diameter. That is, the powder is sieved such that most, if not all, of the particles having a maximum diameter of more than 5 microns are removed. In the context of the present invention, the "maximum dimension," the "particle size," and the "powder size" of the diamond particles all refer to the size to which diamond powder has been graded.

Powder sizes greater than 5 microns in diameter will result in the diamond-coated surface having a rough surface finish. This will require additional measures to finish the coated surface. By using powder size less than 5 microns in diameter, the surface roughness will be approximate to standard industrial finishes. Smaller powder size will also help in suspension of the powder and its dispersion over the workpiece surface. For other applications, the crystallite size chosen will be dependent on nature of the application. In fluid handling applications, the crystallite size will determine the surface roughness and thus the viscosity of the fluid along the container boundary. Here, a rough surface is desirable. It creates slip planes in the fluid which reduces the frictional drag from the walls. If the diamond coated surface is applied to a polishing or finishing wheel, small powder sizes permit polishing operations while very small powder sizes permit finishing operations. If the diamond coated surface is applied to a lapping wheel, larger powder sizes are desirable for performing grinding and lapping operations.

Diamonds of any size may be used to implement the teachings of the present invention. For example, large diamond particles (e.g., diamond particles having a maximum dimension greater than 50 microns) may be used in decorative applications including the adornment of chinaware or jewelry.

In step S2, the workpiece having the diamond-tiled coating is fired to above the glass temperature of the particular porcelain enamel used. For aluminum-based porcelain coated materials, the glass temperature of the porcelain is typically ranges from 500 to 600° C. For steel-based porcelain coated materials, the glass temperature of the porcelain is typically ranges from 650 to 850° C. At these temperatures, the porcelain glass surface becomes fluid. The diamond powder, which still remains far below its melting temperature, penetrates the fluid surface of the porcelain.

In some applications, it is desirable to spray dry diamond powder directly onto the porcelain glass while in the high-temperature fluid state, i.e., after the porcelain has been heated. When the porcelain is heated before the distribution of diamond powder, it may be desirable to heat the porcelain again after the distribution of diamond particles. If an aerosol medium is sprayed directly onto fluid porcelain glass, the aerosol medium is preferably non-explosive to eliminate the risk of explosion.

Diamond attachment to the porcelain surface occurs as a result of chemical and mechanical bonding between the diamond crystallites and the porcelain enamel glass. During the high-temperature firing process, it is observed that the fluid porcelain glass wets the diamond surface. Wetting of one surface by another is evidence of the formation of a chemical bond at the interface between the two materials (the amorphous glass and the crystalline diamond). Furthermore, the expansion coefficient difference between diamond (1 ppm) and the porcelain glass (5–10 ppm) results in compression forces on each of the diamond powder crystallites as the porcelain surface cools below the glass temperature of the porcelain (approximately 550° C., depending on the type of porcelain). These forces serve to embed the diamond crystallites onto the porcelain surface under a compressive stress which adds a mechanical bond.

Once the diamond surface penetration is complete, the workpiece is cooled to below the glass temperature of the porcelain in step S3 so that the porcelain hardens. As the porcelain hardens, compressive stresses develop on the diamond crystallites which serve to fix the diamond crystallites onto the porcelain surface. The cooling ramp to room temperature is best dictated by procedures and practices used in the porcelain industry to prevent spalling of the porcelain enamel coatings.

Residual un-reacted crystallites are removed from the surface in step S4. Preferably, water with an abrasive action is used in step S4 to remove the residual powder. The residual diamond crystallites go into suspension in the water and are rinsed from the surface. The water may be captured and evaporated, leaving behind the un-reacted diamond crystallites. Thus, the un-reacted crystallites are reclaimed for future application.

Diamond surface exposure must be insured if the inherent properties of the diamond are to be realized. For many applications, it is desirable to have a diamond surface exposure percentage that maximizes the lifetime of the workpiece. The diamond surface exposure percentage depends, in part, on the firing conditions and the particle size of the diamond crystallites. For example, the use of extremely coarse powder (e.g., particles having a maximum diameter of at least 10 microns) and short firing times will not permit complete encapsulation of the diamond powder by the porcelain enamel glass. On the other hand, the use of very fine diamond powder (e.g., particles having a maximum diameter less than or equal to 0.1 microns) and long firing times, e.g., four minutes, may result in complete encapsulation of the diamond crystallites in the porcelain glass. In this case, post-firing processes such as mechanical polishing, chemical etching, chemi-mechanical polishing, or reactive ion etching may be used to expose the diamond surfaces. The density of diamond powder at the surface must be a high percentage for the properties of diamond to dictate the performance of the diamond/porcelain composite. The diamond powder may be layered on the surface of the porcelain glass; the layering determines the maximum density of diamond powder obtainable on the unfired surface.

Standard formulae depending on the shape and packing structure will then determine the diamond powder density on the surface. For a single-size spherical particle and a close-packed structure, the diamond crystallites would theoretically occupy 74% of the volume with the remaining volume occupied by air. After firing, the air would be displaced by porcelain glass, leaving a diamond/porcelain composite structure with maximum diamond density of 74%. The top surface of such a theoretical structure would have greater than 78% of its surface diamond exposed. Additional measures known from the composites industry could be utilized (such as mixing of powder sizes) to further increase the volumetric diamond fraction and thus the diamond surface exposure.

As a result of performing steps S1 through S4, the diamond crystallites consolidate onto the workpiece surface with porcelain enamel as the binder. Additional processing may enhance the performance of the workpiece. Chemical etching may remove some of the porcelain enamel exposing more diamond. For example, a reactive ion etch may be used to etch the porcelain on the exposed surface of the workpiece. Mechanical polishing may also be used to expose more diamond. Plasma processing may be used to chemically etch the diamond producing rounder, slicker edges. CVD processing may be used to consolidate the entire surface as diamond, e.g., using a CVD diamond applicator as disclosed in U.S. Pat. No. 5,480,686 and in PCT Publication WO 96/41897 (an international application published under the Patent Cooperation Treaty that claims benefit of priority from U.S. Application Ser. No. 08/483,982, filed Jun. 7, 1995), both of which are herein incorporated by reference in their entirety. If CVD processing is performed, the embedded diamond particles provide seed crystals. In any case, the surface of the diamond is preferably re-hydrogenated in step S5 to restore to the diamond a low coefficient of friction. This is accomplished simply by polishing the diamond-tiled surface with a hydrocarbon oil-based polish.

FIGS. 2($a$) through 2($e$) are sectional schematics of the workpiece at various stages of the process described in FIG. 1. FIG. 2($a$) shows a surface of porcelain enamel 1 which has been vitrified from a firing process. In this manner, a base substrate 2 in FIG. 2($a$) is coated with a highly polished porcelain surface. FIG. 2($b$) shows the workpiece after diamond crystallites 3 have been uniformly distributed over the surface. FIG. 2($c$) shows the workpiece after firing to above the glass temperature of the porcelain enamel 1. The diamond crystallites 3 penetrate into the liquid surface of porcelain while remaining in a solid state. The liquid enamel glass wets the diamond crystallites 3. FIG. 2($d$) shows the surface once the glass is cooled to room temperature. The diamond crystallites 3 are embedded and embossed on the porcelain enamel surface. As can be seen from FIG. 2($d$) some diamond crystallites 3$a$ are not attached due to excessive layering of the diamond crystallites 3. The surface is then rinsed and abrasively scrubbed to remove the excess un-reacted diamond crystallites 3$a$. FIG. 2($e$) shows schematically the final workpiece after the diamond tiling process.

With the present invention, HPHT synthesized diamond powder (a commercial material with more than 100 tons/year produced) may be tiled onto common metal and glass surfaces using porcelain enamel as the high temperature binder to secure the individual diamond crystallites to the surface. Thus, the present invention combines the technology and maturity of two distinct industrial technologies to enable the production of diamond-tiled durable non-stick work-pieces.

The range of substrates which could be tiled by this process is quite extensive owing to the large number of substrates used in the porcelain enamel industry. These metal substrates include low-carbon steel, stainless steel, aluminum, cast-iron, copper, silver, and gold. Outside the porcelain enamel industry, whitewares and other high temperature glasses and ceramics would be quite compatible with this process; for example, CORNINGWARE and other china surfaces which could be used as substrates for this process.

The range of diamond powder sizes which could be used in this process is virtually unlimited, but the preferred range for most applications is between 0.01 and 50 microns (i.e., the maximum dimension of each particle is between 0.01 and 50 microns). If the maximum diameter of the diamond particles exceeds 5 microns, methods other than solvents may be implemented to disperse the powder in an efficient manner. For example, aeration techniques such as those used with sandblasting grit could be used to disperse the diamond particles. Also, the diamond particles could simply be sifted through a screen in order to disperse the diamond particles. Diamond powder available at extremely small sizes (less than 0.1 microns) may be used to implement the invention. At extremely small sizes, diamond powder tends to cake, and thus, the powder will have to be deflocculated before application to the workpiece surface. To avoid burning extremely fine diamond powder, care should be taken in the firing step to avoid oxidizing the diamond powder. This can be accomplished by either reducing the time at high temperature, firing at temperatures below 800° C., or restricting the amount of available oxygen.

The range of porcelain enamel glasses which can be used with the present invention is quite extensive. The available range of porcelains is limited only by the expertise of the porcelain enamel industry in developing different porcelains and methods of adhering different porcelains to base metals. Materials other than porcelain that are capable of forming strong mechanical or chemical bonds with diamond crystallites may also be used to bind diamond crystallites to workpieces; for example, various glasses, whitewares, and ceramics other than porcelain may be used as a high temperature binder for the diamond crystallites.

The present invention may benefit from the vast knowledge which has accumulated from years of industrial practice. Thus, the annealing times and cycles will be dependent on the characteristics of the enamel selected by the porcelain industry or other pertinent industries. For steel-based enamel coated substrates, relatively higher temperature enamels that permit temperatures and cycles near 850° C. may be appropriate. For various aluminum alloy-based enamel coated substrates, relatively lower temperature enamels are appropriate so as not to melt the base substrate; such enamels will be limited to temperatures and cycles near 550 to 600° C.

Likewise, the atmospheres in the kiln will be determined by the porcelain enamel practice. Experience in the porcelain enamel industry has shown that humidity should be controlled in the kiln to eliminate crazing of the enamel finishes. For the practice illustrated in FIGS. 2($a$) through 2($e$), this may not be an extreme issue because the enamel frit has already been fired by the porcelain manufacturer producing an adherent, glass-protected surface of porcelain enamel 1.

Another sectional schematic of the workpiece and the process for forming a diamond-tiled workpiece is shown in FIGS. 3($a$) through 3($e$). FIG. 3($a$) shows a surface of porcelain enamel coating a base substrate 2. FIG. 3($b$) shows the workpiece after porcelain frit 4 and diamond crystallites 3 have been distributed over the porcelain enamel 1. Diamond powder may be layered on the surface to provide the diamond crystallites 3. FIG. 3($c$) shows the workpiece after firing to above the glass temperature of the porcelain enamel 1. The diamond crystallites 3 penetrate into the liquid surface of porcelain enamel 1 while remaining in a solid state. The liquid porcelain enamel 1 is a fluid enamel glass that wets the diamond powder layers. FIG. 3($d$) shows the workpiece once the glass (porcelain enamel 1) is cooled to room temperature. The diamond crystallites 3 are embedded and embossed on the surface of porcelain enamel 1. As can be seen from FIG. 3($d$) some diamond crystallites 3$a$ are not attached due to excessive layering of the diamond crystallites. In this case, the surface is then rinsed and abrasively scrubbed to remove the excess un-reacted diamond crystallites 3a. FIG. 3(e) is a sectional view of the final workpiece after the diamond-tiling process.

Figure 4A:
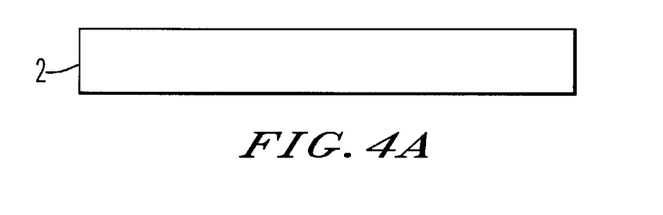
FIGS. 4(a) through 4(e) are sectional views of a workpiece at various processing steps when using an un-fired porcelain ceramic surface as the starting workpiece.

Another sectional schematic of the workpiece and the process for forming a diamond-tiled workpiece is shown in FIGS. 4(a) through 4(e). FIG. 4(a) shows an uncoated base substrate 2 made of an un-fired porcelain ceramic. Alternatively, the base substrate 2 may be steel, a steel alloy, aluminum, an aluminum alloy, or any other material on which a porcelain enamel coat can be formed.

Figure 4B:
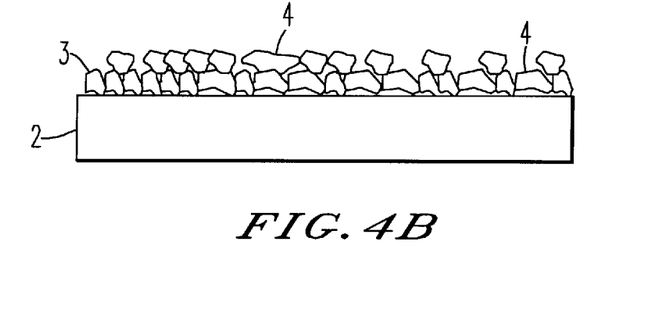

FIG. 4(b) shows the workpiece after porcelain frit 4 and diamond crystallites 3 have been distributed over the surface of the base substrate 2. Diamond powder may be layered on the surface to provide the diamond crystallites 3.

Figure 4C:
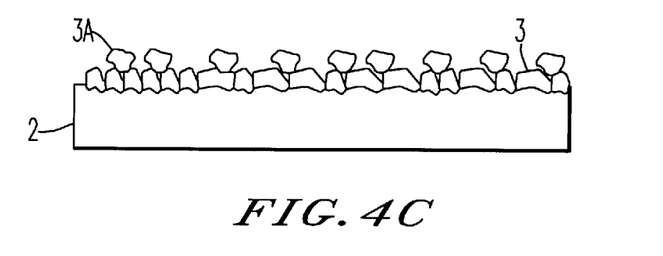

FIG. 4(c) shows the workpiece after firing to above the glass temperature of the porcelain frit 4. The diamond crystallites 3 penetrate into the liquid enamel surface while remaining in a solid state. The fluid enamel porcelain glass wets the diamond powder layers. Preferably, the substrate 2 has a higher melting point than the porcelain frit 4. However, if a laser system or flash annealing technique is used to melt the porcelain frit 4, the diamond coated layer may be formed on a substrate 2 having a melting point below the melting point of the frit 4.

Figure 4D:
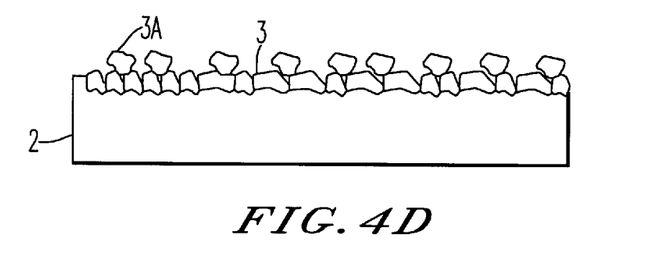
Figure 4E:
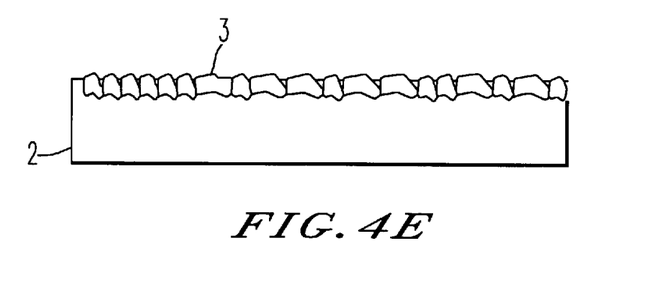

FIG. 4(d) shows the surface once the fluid enamel porcelain glass is cooled to room temperature. The diamond crystallites 3 are embedded and embossed on the porcelain enamel surface of the workpiece. As can be seen from FIG. 4(d) some diamond crystallites 3a are not attached due to excessive layering of the diamond powder. The surface of the workpiece is then rinsed and abrasively scrubbed to remove the excess un-reacted diamond crystallites 3a. FIG. 4(e) shows schematically the final workpiece after the diamond tiling process.

A propane-fired kiln may be used in the production of diamond-tiled surfaces. Numerous books and technical reports describe the operation, specification, and construction of industrial kilns. A simple kiln constructed from standard, commercial parts may be used to practice the present invention. At the base of such a kiln is a 20,000 BTU propane burner mounted in a cast-iron stand. The cast-iron stand also provides a grate upon which the workpieces can be set. For example, a flat porcelain-coated steel pan, pre-treated with diamond powder may be placed on the grate. Above the pan is a kiln cover which provides thermal insulation forcing a stagnant, non-convecting column of air to exist above the pan. The kiln cover is further insulated using aluminum foil to create a high temperature oven. The burner burns a stoichiometric mixture of air and propane. The burnt stream of gas directly heats the porcelain pan. The temperature of the pan can be observed by viewing the pan surface by looking through the grate and beside the propane exhaust.

Following the firing process, the work-pieces are removed from the kiln. Powder which, due to layering, does not react with the porcelain enamel is washed and abrasively scrubbed from the surface. The diamond embossed surface is then treated with an oil-based polish to restore the surface state of the diamond crystallites to an hydrogenated state. An olive-oil polish may be used to restore the hydrogenation of the diamond surfaces. Alternatively, the surface of the workpiece may be vacuum fired in order to oxygen denude the surface before exposing the denuded surface to a variety of hydrogen sources such as atomic hydrogen, water, or hydrocarbons.

A scanning electron microscope (SEM) image of a diamond-tiled workpiece following diamond consolidation using the method of this invention reveals that the porcelain enamel wets the diamond surface and embosses the diamond onto the porcelain surface.

The process by which the diamond crystallites are fixed on the surface is a complex process. However, the wetting of the diamond crystallites by the porcelain glass is itself evidence of a reactive bond occurring between the diamond and the glass. Reactions between carbon and silica are well studied reactions and are used quite prevalently today for the production of silicon carbide abrasives through the following reaction:

$$SiO_2 + C(graphite) \rightarrow SiC + CO (1200° C.)$$

Diamond, however, is more stable than graphite, and the temperatures employed in the present invention are much lower than the temperatures used in the production of silicon carbide abrasives. Thus, a reaction between diamond and silica in the present invention is remarkable. Such reactions are undoubtedly limited to surface reactions and can be understood in the light of diamond surface chemistry. Diamond as a hydrogenated surface is a very stable. non-reactive surface. Literature reports that the hydrogenated surface of a diamond gives the diamond its low coefficient of friction. Once the surface becomes denuded, the coefficient of friction (a measure of the surface's reactivity) increases. Oxygen terminated surfaces are also fairly reactive showing a high coefficient of friction. In addition to these studies, published work shows the thermal stability of hydrogenated and oxygenated diamond surfaces. It is known that at elevated temperatures hydrogen and oxygen both desorb from the diamond surface. Hydrogen desorbs at 800° C., and oxygen (as CO) desorbs at 600° C.

The present invention utilizes high temperature surface reactions to present to the fluid porcelain surface "reactive" diamond surfaces upon which the porcelain can wet. Yet, the temperatures used in the present invention remain below values at which there would be spontaneous reaction of the diamond and silica to form bulk SiC and CO.

A map of the surface carbon (diamond) and surface silicon (porcelain) on the surface of a workpiece treated by the inventive method reveals the degree of diamond exposure. One such map revealed that a diamond exposure of approximately 50% was obtained. Improvements in dispersion and firing techniques will make possible the production of surfaces having a diamond exposure of well over 50%. Also, mechanical and chemical techniques can be used after firing to expose diamond.

A Raman spectrum from a workpiece treated by the inventive method reveals the effect of firing on the diamond powder. The 1332 cm$^{-1}$ line of one such Raman spectrum revealed the presence of diamond and showed that the diamond was neither dissolved by the molten porcelain, burnt away by the firing atmosphere, nor reacted into SiC.

This invention will be further illustrated by the following examples:

EXAMPLE 1

A diamond-tiled durable workpiece was produced using the process described in FIG. 1 and the simple kiln described above. A porcelain enameled pan was purchased. The pan sold under the trade name GRANITE-WARE and had a blueish porcelain enamel finish. The bowl contained a flat bottom. The pan had an outside diameter of 28 cm and a height of 7 cm. The interior bottom surface of the pan was 13 cm in diameter. Diamond powder screened to powder sizes less than 0.5 microns in diameter (i.e., the diamond particles had maximum dimensions of less than 0.5 microns) were suspended in 120 cubic centimeters of acetone, using agitation to place the powder in suspension. The fluid along with the suspended diamond powder was placed in a commercial spray gun made by PREVAL. Then the pan was heated to approximately 35° C. Next, the suspended acetone/diamond solution was sprayed onto the bottom surface of the pan. The acetone quickly evaporated on contact, leaving behind a relatively uniform coating of diamond powder.

The coated pan was then fired on a kiln resembling the simple kiln described above with the exception that no top cover was used and the pan was suspended upright above the flame of the propane burner. The pan was locally heated by the individual pilots on the burner, producing local hot regions on the bottom. As these hot spots approached approximately 800° C., the diamond powder penetrated the porcelain surface. The pan was held at 800° C. for approximately 30 seconds. By moving the pan around the burner pilots, the bottom surface of the porcelain enameled pan was tiled with diamond.

The pan was cooled to room temperature, rinsed with water, and abrasively scrubbed to remove any residual diamond powder. The diamond coverage of the treated area ranged from 50 to 70 percent. The pan was then rubbed with olive oil to re-hydrogenate the diamond surface. The surface was then wiped dry of excess oil. Scouring the pan with SCOTCHBRITE pads resulted in no visible abrasion of the diamond-tiled surface.

Cooking tests were performed. Eggs fried on this surface (using no cooking oil or spray) readily released from the diamond-tiled surface. Even those surfaces where the eggs burned against the pan could be removed with minimal force under water. To evaluate the stain-resistance of the pan against dry cooking, cooking spray was applied to the surface and the surface was cooked until the oil burned onto the surface producing a dark brown film. Continued heated of the pan merely oxidized away the burnt cooking spray, analogous to a self-cleaning oven interior except that the stains completely atomized not leaving any coked material.

EXAMPLE 2

Electric stove top element covers are typically formed of porcelain enameled steel. A 21 cm diameter element cover was purchased with a green enamel color finish. The electric stove top element cover was diamond powder coated using the same method as used in EXAMPLE 1. The stove top element cover, pre-treated with diamond powder was then placed on the grate of a propane-fired kiln similar to the one described above. The kiln cover was placed above the kiln. Similar to EXAMPLE 1, the pan was fired to approximately 750° C. The element cover was kept at approximately 750° C. for about 3 min. The element cover was cooled to room temperature, had the excess powder removed, and was rehydrogenated using the olive oil treatment.

Visually, the element cover did not show as complete a coverage of diamond powder as the pan in EXAMPLE 1. Nonetheless, cooking tests showed the surface to be stick resistant and impervious to abrasion by standard scouring pads used on metal cookware.

EXAMPLE 3

An electric kiln was used as an alternative to the propane fired kiln used in the previous examples. The electric kiln was calibrated for temperature and thus provided a more accurate processing environment. The isothermal nature of the commercial electric kiln provided a better processing environment for practice of this invention. The electric kiln used was a Model 145E electric kiln manufactured by Allcraft Tool and Supply, Inc., Hicksville, N.Y.

Green porcelain enamel soup bowls manufactured by CINSA (soup plate model number 22) were obtained for diamond tiling. The soup bowls were cleaned using a detergent cleaner, dried on a hot plate, and then coated with a dry diamond coating using the dispersion and spray practice used in EXAMPLES 1 and 2. Various bowls were inserted into the electric kiln at progressively higher temperatures until the temperature was sufficient for reaction of the diamond powder with the porcelain enamel. It was found that at temperatures of 670° C. the dry diamond powder bonded to the porcelain enamel within two minutes. It was then possible to re-coat with diamond powder and bond additional diamond powder onto and in the porcelain enamel surface. After each re-coating, the porcelain surface became whiter in color and mottled.

One bowl was coated and fired 4 times at 680° C. for 2 minutes each time. A glass etch (sodium bifluoride) was then used to etch expose the diamond. The surface, somewhat roughened by the firing treatment, was then polished by hand using progressively higher grades of SiC sandpaper (320, 400, and 600 grades). The resulting polished surface, like those in the previous examples, showed excellent non-stick properties. After the initial polishing following the etch, the surface showed very little sign of wear by the abrasive papers despite extensive abrasion. By comparison, the same abrasive paper on untreated bowls immediately showed scuffing and scratching on the porcelain glass surface.

Additionally, the performance of the bowl to chemical etch by the sodium bifluoride was compared to a standard porcelain enamel bowl. The standard bowl was visibly frosted by the glass etch solution. On the other hand, the diamond-tiled bowl made in EXAMPLE 2 was not visibly frosted.

EXAMPLE 4

White porcelain enameled Al pans were obtained from Regal-Ware, Inc. The pans were 25 cm diam pans which had been coated at Regal with~75 $\mu$m of porcelain enamel. Like EXAMPLE 3, an electric kiln Model 145 from Allcraft Tool and Supply was used. The pans were sprayed with an aerosol solution similar to that used in EXAMPLES 1 and 2. However, now a larger diamond powder was used. Diamond powder purchased from the Tomei Corporation was used. The powder was graded to a 5–10 $\mu$m size powder. The aerosol solution consisted of 0.250 gms of diamond powder and 150 ml of acetone. Approximately 35 ml of this solution was aerosol sprayed onto the porcelain coated Al pan, allowing the acetone to evaporate, leaving the dry diamond powder on the surface.

The pan was placed in the kiln, which had been pre-heated to 500° C. The pan was then heated to 570° C. over a 12 min time frame and then ramped down for 12 min to 500° C. before opening door to kiln and removing it from the oven.

The pan like previous examples was very resistant to abrasion as tested against various grades of SiC paper (320, 400 and 600 grades). The resultant surfaces were showed good non-stick properties which could be improved by buffing with a light oil coat.

COMPARATIVE EXAMPLE

A light blue plate, precoated with diamond powder, was inserted into the electric kiln used in EXAMPLE 3. The plate was kept in the electric kiln for 15 minutes during which time the temperature in the kiln rose from 750 to 950° C. After cooling, the light blue enamel on the plate had darkened and blistered. No residual diamond powder remained on the surface as in EXAMPLES 1, 2, and 3.

ADDITIONAL APPLICATIONS

In the above examples, various implements were produced in the practice of this invention. These implements involved the formation of diamond tiled surfaces on plates, bowls, pans, and electric stove top heating elements. Diamond tiled surfaces made in accordance with the present invention have many potential uses. Other such implements include cookware; grinding devices; lapping devices; polishing devices; finishing devices; plumbing fixtures including cast iron or steel fixtures having a porcelain coated surface such as bathtubs, toilets, and sinks; skis; skids; heat presses, for example, the type of heat press used to fuse plastic or cellophane sheets in the manufacture of plastic or cellophane bags; flatirons; boat hulls and other surfaces exposed to marine environments; electrostatic chucks for handling semiconductor wafers; bearings; sliding surfaces of sliding electrical contacts; and any other application that could benefit from a durable, non-stick surface that is resilient to high temperatures and resistant to abrasion.

According to the present invention, a diamond-tiled surface can be formed on a thin porcelain layer. The resultant structure may then be laminated onto a conventional product such as a ski to provide a durable, non-stick (i.e., low coefficient of friction) ski surface.

In addition, the high diamond content of these surface coatings makes these coatings electrically insulating and thermally conductive. Thus, according to the present invention, in a diamond tiled surface can be formed on top base metals to provide electrical insulation from and thermal conduction to the base metal. Accordingly, metal-based thermal spreaders and electrical resistance heaters can be made with the methods of this invention. Thus, the present invention has utility in very wide fields of application.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing a diamond-tiled workpiece, comprising:
    providing a workpiece having at least one ceramic surface, said ceramic surface comprising a ceramic binder including a porcelain enamel;
    layering diamond particles on said at least one ceramic surface to produce a substantially contiguous layer of said diamond particles;
    heating the ceramic binder to at least a glass transition temperature of the porcelain enamel; and
    cooling the ceramic binder so that diamond particles are bonded to the workpiece via the ceramic binder to thereby produce a substantially contiguous diamond-tiled coating layer.

2. The method of claim 1, wherein the layering step comprises:
    mixing the diamond particles with a volatile solvent; and
    spraying mixed diamond particles and volatile solvent onto said at least one ceramic surface of the workpiece.

3. The method of claim 1, wherein the layering step comprises:
    electrostatically spraying said at least one ceramic surface of the workpiece with diamond particles.

4. The method of claim 1, further comprising:
    partially removing a part of the ceramic binder bonded to the diamond particles so that at least 40 percent of an exposed surface is diamond.

5. The method of claim 4, wherein the removing step comprises:
    etching the ceramic binder.

6. The method of claim 4, wherein the removing step comprises:
    polishing the exposed surface.

7. The method of claim 1, wherein the providing step comprises:
    providing a ceramic cooking utensil.

8. The method of claim 1, wherein the providing step comprises:
    providing a metal cooking utensil including a ceramic layer as said at least one ceramic surface.

9. The method of claim 1, wherein the heating step comprises:
    heating the ceramic binder to a maximum temperature between 500 and 900° C.

10. The method of claim 1, further comprising:
    repeating the steps of layering, heating, and cooling until at least a predetermined percentage of the exposed surface is diamond.

11. The method of claim 1, wherein the layering step comprises:
    distributing diamond particles having a maximum dimension of less than or equal to 50 $\mu$m.

12. The method of claim 4, further comprising:
    performing a chemical vapor deposition to deposit diamond on the exposed surface.

13. The method of claim 4, further comprising:
    hydrogenating the exposed surfaces of the diamond particles.

14. A method for producing a diamond-tiled stick-resistant workpiece comprising:
    providing a workpiece having at least one surface;
    distributing a ceramic binder on said at least one surface of the workpiece, said ceramic binder including a porcelain enamel;
    layering diamond particles onto the distributed ceramic binder to produce a substantially contiguous layer of said diamond particles;
    heating the ceramic binder to at least a glass transition temperature of the porcelain enamel; and
    cooling the ceramic binder so that diamond particles are bonded to the workpiece via the ceramic binder to produce a substantially contiguous diamond-tiled coating layer.

15. The method of claim 14, wherein the layering step comprises:
    mixing the diamond particles with a volatile solvent; and
    spraying mixed diamond particles and volatile solvent onto the distributed ceramic binder.

16. The method of claim 14, wherein the layering step comprises:
    electrostatically spraying the distributed ceramic binder with diamond particles.

17. The method of claim 14, further comprising:

partially removing the ceramic binder from bonded diamond particles so that at least 40 percent of an exposed surface is diamond.

18. The method of claim 17, wherein the removing step comprises:

etching the ceramic binder.

19. The method of claim 17, wherein the removing step comprises:

polishing the exposed surface.

20. The method of claim 14, wherein the providing step comprises:

providing a ceramic cooking utensil.

21. The method of claim 14, wherein the providing step comprises:

providing a metal cooking utensil.

22. The method of claim 14, wherein the heating step comprises:

heating the ceramic binder to a maximum temperature between 500 and 900° C.

23. The method of claim 14, further comprising:

repeating the steps of layering, heating, and cooling until at least a predetermined percentage of an exposed surface is diamond.

24. The method of claim 14, wherein the step of layering comprises:

distributing diamond particles having a maximum dimension of less than or equal to 50 $\mu$m.

25. The method of claim 17, further comprising:

performing chemical vapor deposition to deposit diamond on the exposed surface.

26. The method of claim 17, further comprising:

hydrogenating the exposed surface.

27. The method of claim 14, wherein the step of distributing a ceramic binder comprises:

distributing a porcelain powder frit.

28. The method of claim 14, wherein the steps of distributing a ceramic powder and layering diamond particles is performed simultaneously using a mixture of said ceramic powder and said diamond particles.

* * * * *